United States Patent
Parsana et al.

(10) Patent No.: US 10,095,788 B2
(45) Date of Patent: Oct. 9, 2018

(54) CONTEXT-SENSITIVE DEEPLINKS

(75) Inventors: Mehulkumar Parsana, Bangalore (IN);
Rahul Agrawal, Bangalore (IN);
Krishna Leela Poola, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 940 days.

(21) Appl. No.: 13/437,443

(22) Filed: Apr. 2, 2012

(65) Prior Publication Data
US 2013/0262427 A1   Oct. 3, 2013

(51) Int. Cl.
*G06F 17/30* (2006.01)

(52) U.S. Cl.
CPC ................ *G06F 17/30864* (2013.01)

(58) Field of Classification Search
CPC ......... G06F 17/30014; G06F 17/30846; G06F 17/30882; G06F 17/3089; G06F 17/30864
USPC ................ 707/705, 706, 722, 726, 790, 803
See application file for complete search history.

(56) References Cited

U.S. PATENT DOCUMENTS

| | | | | |
|---|---|---|---|---|
| 6,480,837 | B1 * | 11/2002 | Dutta | ......................... 707/999.3 |
| 7,877,389 | B2 | 1/2011 | Klinkner et al. | |
| 2008/0005108 | A1 * | 1/2008 | Ozzie et al. | ...................... 707/7 |
| 2009/0070326 | A1 | 3/2009 | Kraft | |
| 2009/0089245 | A1 | 4/2009 | Chi | |
| 2009/0210402 | A1 | 8/2009 | Yoo et al. | |
| 2009/0249198 | A1 | 10/2009 | Davis et al. | |
| 2010/0100808 | A1 * | 4/2010 | Hawkins | ....................... 715/234 |
| 2010/0179876 | A1 * | 7/2010 | Holte | ......................... 705/14.54 |
| 2011/0191342 | A1 * | 8/2011 | Cohen et al. | ................. 707/737 |
| 2011/0264673 | A1 | 10/2011 | White et al. | |

OTHER PUBLICATIONS

Hinne, et al., "A Multi-dimensional Model for Search Intent", In 11th Workshop of Dutch-Belgian Information Retrieval, Feb. 4, 2011, 4 pages.
Jones, et al., "Beyond the Session Timeout: Automatic Hierarchical Segmentation of Search Topics in Query Logs", In Proceedings of the 17th ACM Conference on Information and Knowledge Management, Oct. 26-30, 2008, pp. 699-708.
Bar-Yossef, et al., "Context-Sensitive Query Auto-Completion", In Proceedings of the 20th International Conference on World Wide Web, Mar. 28-Apr. 1, 2011, pp. 107-116.

(Continued)

*Primary Examiner* — Hares Jami
(74) *Attorney, Agent, or Firm* — Shook, Hardy & Bacon L.L.P.

(57) ABSTRACT

Deeplinks relevant to the context of a search query are included with a search result returned in response to the search query. Deeplink hierarchies may be generated for websites by analyzing web pages within the websites. A deeplink hierarchy for a website includes a hierarchy of nodes with each node including a group of deeplinks to web pages within the website. When a search query is received and a web page result identified, the search query may be employed to identify a relevant node of deeplinks from a deeplink hierarchy for a website corresponding with the web page result. A search result may then be returned for the web page result that includes the identified deeplinks.

17 Claims, 5 Drawing Sheets

(56) References Cited

OTHER PUBLICATIONS

Chuang, et al., "Towards Automatic Generation of Query Taxonomy: A Hierarchical Query Clustering Approach", In Proceedings of the IEEE International Conference on Data Mining, 2002, pp. 75-82.
Sieg, et al., "Using Concept Hierarchies to Enhance User Queries in Web-based Information Retrieval", In Proceedings of the International Conference on Artificial Intelligence and Applications, Feb. 2004, 10 pages.

* cited by examiner

CONTEXT-SENSITIVE DEEPLINKS

BACKGROUND

The amount of information and content available on the Internet continues to grow exponentially. Given the vast amount of information, search engines have been developed to facilitate web searching. In particular, users may search for information and documents by entering search queries comprising one or more terms that may be of interest to the user. After receiving a search query from a user, a search engine identifies documents and/or web pages that are relevant based on the terms. A search page is returned with a list of hyperlinks to "landing pages" that correspond with the identified documents and/or web pages. Because of its utility, web searching, that is, the process of finding relevant web pages and documents for user-issued search queries has arguably become one of the most popular services on the Internet today. However, in some instances, when a user selects a search result and accesses a landing page, although that landing page may be within a website (i.e., collection of web pages within a given domain) that contains the information the user is after, that particular landing page may not have the relevant information. As a result, the user may have to browse or search pages within the website to find the information the user is seeking.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing context-sensitive deeplinks for search results. In accordance with some embodiments, deeplink hierarchies may be generated for websites. Each deeplink hierarchy may be generated based on web pages within a website and may include a hierarchy of nodes with each node including a group of deeplinks to web pages within the website. When a search query is received and web page result identified, a deeplink hierarchy for a corresponding website may be identified. A node from the deeplink hierarchy may then be identified based on the search query. Accordingly, deeplinks from that node may be relevant to the context of the search query. A search result may then be generated for the web page result to include those context-sensitive deeplinks.

BRIEF DESCRIPTION OF THE DRAWINGS

The present invention is described in detail below with reference to the attached drawing figures, wherein.

DETAILED DESCRIPTION

Figure 1:
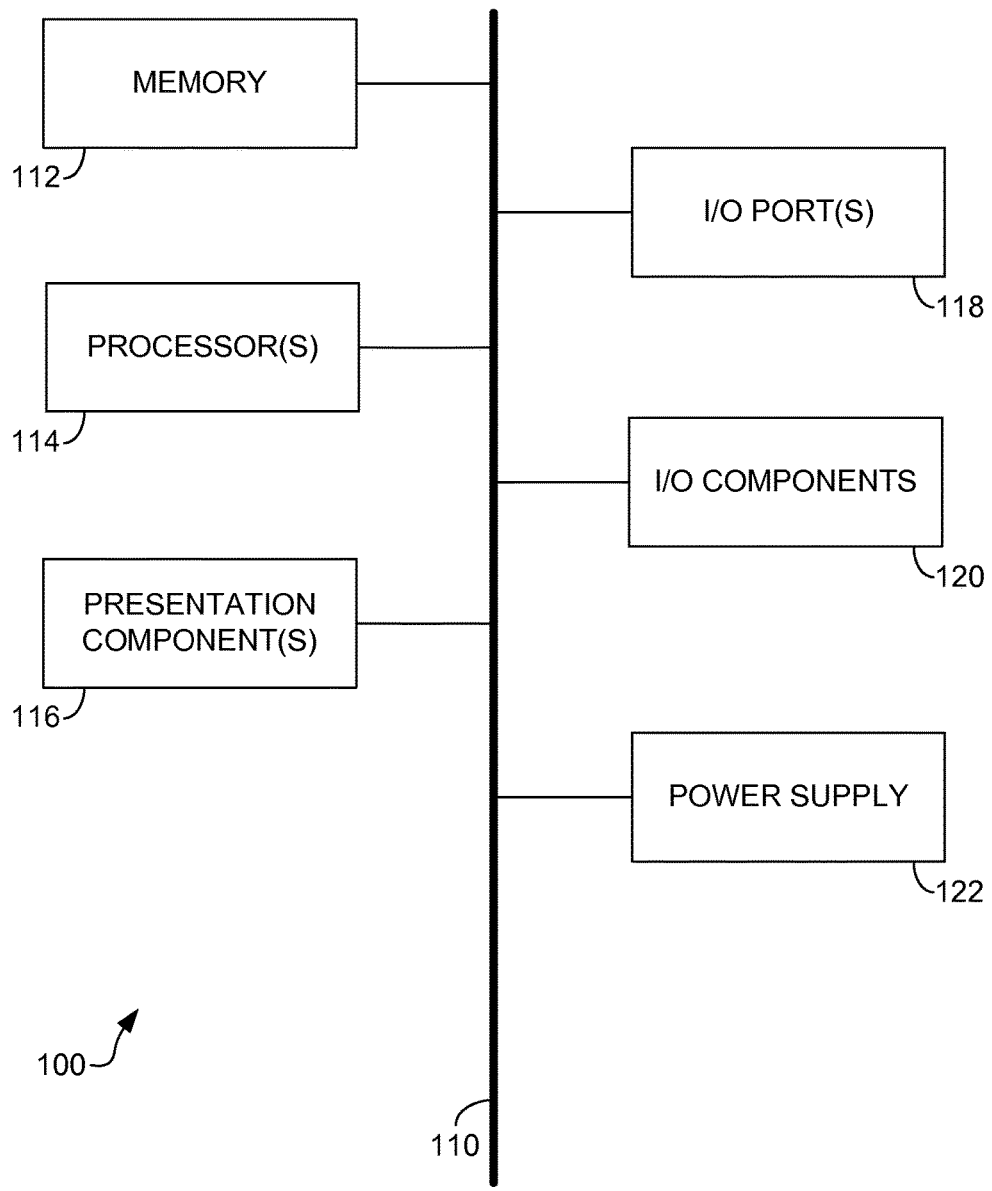
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed above, one problem that users may face when employing search engines is that although a search result returned may correspond with a web page within a website containing the relevant information the user is seeking or a particular action the user wishes to perform, the user may be required to browse the website after selecting the search result to find the information or to perform the action. For instance, suppose a user wishes to check into a flight on an airline. The user may issue a search query for the airline and receive search results that include a hyperlink to the main web page of the website for the airline. After selecting the hyperlink to the main web page for the airline, the user would then need to find a location within the web site for checking into the flight. In some cases, this may be a time-consuming task.

One approach to addressing this problem has been the inclusion of deeplinks in search results on search result pages. As used herein, the term "deeplinks" refers to additional hyperlinks that are provided in association with a matching search result. In other words, a search result may include a hyperlink to a main destination web page, as well as deeplinks to other web pages associated with the main destination web page. For instance, in the example above, a hyperlink to the location for checking into flights for the airline could be included as a deeplink in association with the hyperlink to the main web page for the airline provided as a search result to a user's search query.

Although deeplinks may allow users to more quickly access the information they are seeking or perform particular actions, the deeplinks provided with a search result may be insufficient in some instances. For example, a variety of deeplinks may be available for a search result, but given the limited space for the search result, only a subset of the available deeplinks may be presented. In some instances, a deeplink that links to an action or information the user is seeking is not one of the displayed deeplinks.

Some embodiments of the present invention are directed to providing deeplinks with search results that are relevant to the context of the search queries for which the search results are returned. Accordingly, the deeplinks are more likely to be directed to information that end users are seeking when submitting their search queries. The context-sensitive deeplinks may be provided by first generating deeplink hierarchies for websites. Each deeplink hierarchy includes a hierarchy of nodes with each node including a group of similar deeplinks into a website. The deeplink hierarchy for a website may then be used to select deeplinks for search results that are relevant to the context of the search queries for which the search results are returned.

Accordingly, in one aspect, one or more computer storage media may store computer-useable instructions that, when used by one or more computing devices, cause the one or more computing devices to perform a method. The method includes performing an analysis of web pages within a website. The method also includes generating a deeplink hierarchy for the website based on the analysis of the web pages within the website, the deeplink hierarchy including nodes at various levels in the hierarchy, each node including a set of deeplinks corresponding with a subset of web pages within the website. The method further includes storing information regarding the deeplink hierarchy for the website for use in providing deeplinks for search results.

In another aspect, a method may be performed by a search engine service that includes one or more computing devices with one or more processors. The method includes receiving a search query from an end user at the search engine service. The method also includes identifying a web page in response to the search query by querying a search engine index based on the search query. The method further includes accessing information regarding a deeplink hierarchy for a website at which the web page is located, the deeplink hierarchy comprising a hierarchy of nodes, each node including a group of one or more deeplinks that link to web pages at the website. The method also includes identifying deeplinks for the web page based on the deeplink hierarchy and the search query from the end user. The method further includes generating a search result for the web page to include the deeplinks. The method still further includes providing the search result for presentation to the end user.

In a further aspect, a search engine system may include a processor and a plurality of components. The components includes a deeplink hierarchy generation component that analyzes information for a plurality of websites and generates a deeplink hierarchy for each website, each deeplink hierarchy including a hierarchy of nodes with each node including a group of deeplinks that link to web page within a given website. The components also include a user interface component that operates to receive search queries from end users and to return search results in response to the search queries. The components further include a deeplink hierarchy analysis component that operates to identify relevant deeplinks for the search results based on the deeplink hierarchies.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not include signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
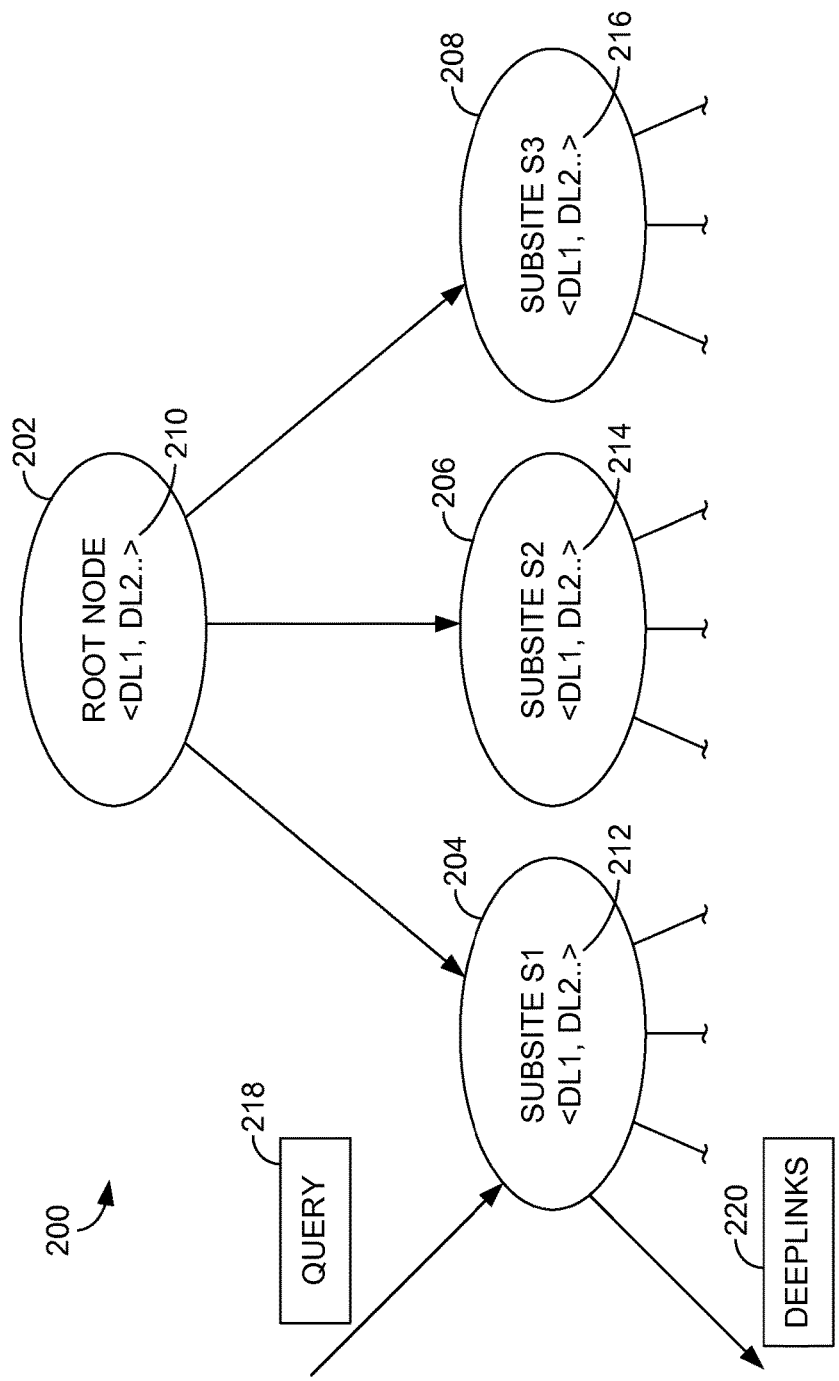
FIG. 2 is a diagram illustrating a deeplink hierarchy for a website for use in selecting context-sensitive deeplinks in accordance with an embodiment of the present invention.

As noted previously, some embodiments of the present invention are directed to generating a deeplink hierarchy for a website and using the deeplink hierarchy to select context-sensitive deeplinks for search results. By way of illustration, FIG. 2 illustrates an example deeplink hierarchy 200 for a website. As will be described in further detail below, the deeplink hierarchy 200 may be generated by analyzing information regarding the web pages located within the website. The deeplink hierarchy 200 may generally include a hierarchy of nodes, such as nodes 202, 204, 206, 208. Each node includes a group of deeplinks, such as the deeplinks 210 for node 202, deeplinks 212 for node 204, deeplinks 214 for node 206, and deeplinks 216 for node 218. Each deeplink corresponds with a web page within the website.

By grouping deeplinks at nodes in the deeplink hierarchy 200, context-sensitive deeplinks may be selected for search results at runtime. For instance, when a search query 218 is received, a web page result may be identified and a set of deeplinks 220 associated with that web page result may be determined from the deeplink hierarchy 200. In particular, the search query 218 may be employed to identify a node of deeplinks relevant to the search query. For instance, FIG. 2 illustrates the node 204 being identified based on the search query 218. Based on identifying the node 204 for the search query 218, deeplinks 220 may be identified based on the set of deeplinks 212 from the node 204 and used to generate a search result. Accordingly, the search result may include a main link to the web page identified as the web page result and the deeplinks 220.

In some instances, nodes at higher levels in the hierarchy may include deeplinks to web pages with less specificity, while nodes at lower levels may include deeplinks to web pages with increasing specificity. Accordingly, deeplinks of appropriate specificity may be retrieved based on the context of the search query. For instance, suppose the deeplink hierarchy 200 is for a website that sells a selection of consumer products. Higher level nodes may include deeplinks to broader categories of consumer products generally (e.g., electronics, books, music, etc.). Traversing down levels in the deeplink hierarchy 200 may provide more specificity at each level (e.g., televisions, cameras, mobile phones, etc. below electronics; different television manufacturers or other attributes below televisions; etc.). The lowest level nodes may include deeplinks directed to specific products.

This varying specificity of deeplinks in the deeplink hierarchy 200 may allow, for instance, deeplinks of a specificity that is appropriate for a given search query to be retrieved and provided as part of a search result. For example, a search query that includes "cameras" may result in more general deeplinks than a search query that includes "xyz brand camera."

Figure 3:
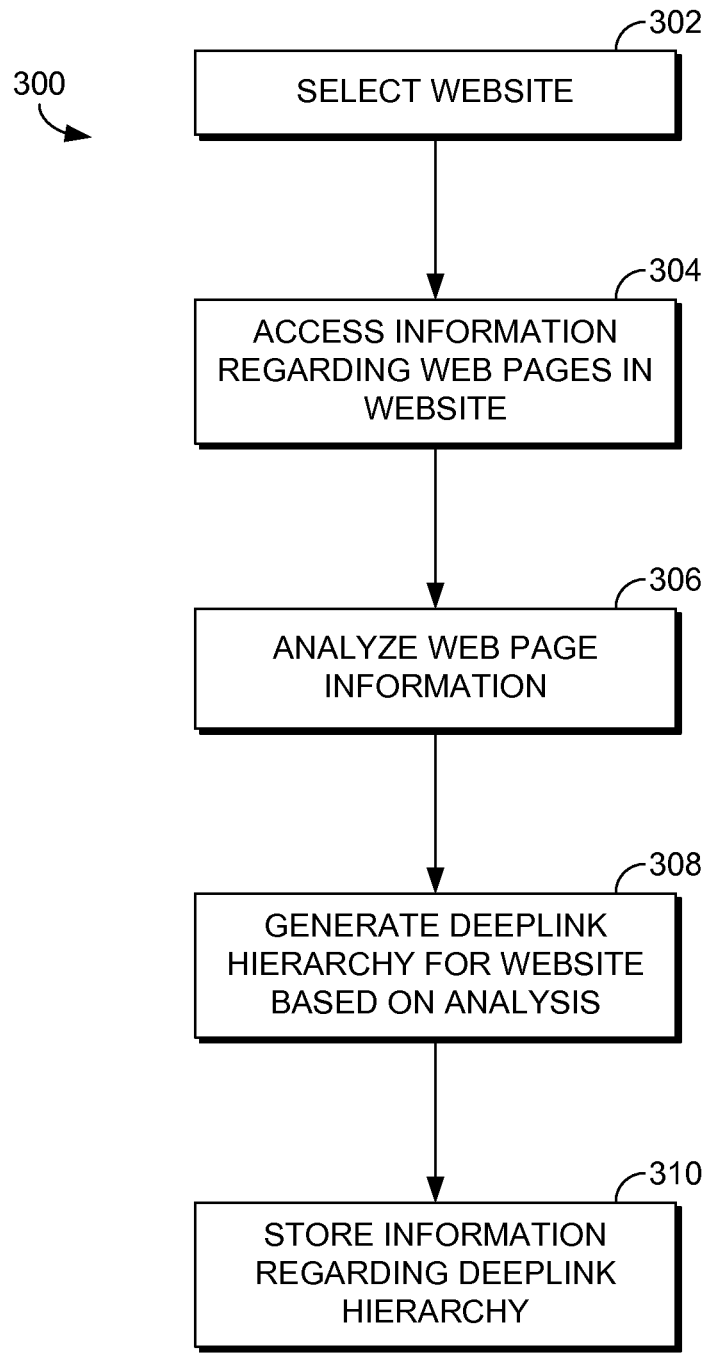
FIG. 3 is a flow diagram showing a method for generating a deeplink hierarchy for use in selecting deeplinks for search results in accordance with an embodiment of the present invention.

Turning to FIG. 3, a flow diagram is provided that illustrates a method 300 for generating a deeplink hierarchy for use in selecting deeplinks for search results. As shown at block 302, a website is selected for analysis. Information regarding web pages within the selected website is accessed at block 304. The information may be accessed, for instance, by crawling the web pages within the website. In some instances, the website may have been previously crawled and information regarding the web pages within the website indexed. In such instances, the indexed information may be accessed at block 304.

The web page information is analyzed at block 306. Based on the analysis, a deeplink hierarchy is generated for the website, as shown at block 308. Generally, the deeplink hierarchy comprises a hierarchy with nodes in which each node includes a collection of similar deeplinks for the website. Each deeplink corresponds with a particular web page within the website.

A deeplink hierarchy may be generated for a website using any number of different methods and using a variety of different web page information within the scope of embodiments of the present invention. By way of example only and not limitation, deeplink hierarchies may be generated based on the URL structure (or pattern) of web pages within the website, a sitemap for the website, content of the web pages, anchor text of hyperlinks to the web page, and historical user web browsing information that may include information regarding user transitions through the website.

Some approaches analyze the URL structure or pattern of the web pages in conjunction with the content of web pages to generate the deeplink hierarchy. The URL structure and content of the web pages may be used, for instance, to determine the hierarchy level for each web page and to group web pages into nodes at each level. By way of example to illustrate, a root node of the hierarchy may correspond with the web site domain, such as www.examplewebsite1.com. The root node may include web pages with a URL structure that directly corresponds with the website domain (e.g., www.examplewebsite1.com/consumerproducts and www.examplewebsite1.com/officeproducts and www.examplewebsite1.com/industryproducts). The next level in the hierarchy may include web pages that have URLs that include a next level path as part of the URL. For instance, one node in the second level may correspond with the "subsite" www.examplewebsite1.com/consumerproducts and may include web pages with URLs such as www.examplewebsite1.com/consumerproducts/electronics, www.examplewebsite1.com/comsumerproducts/books, and www.examplewebsite1.com/consumerproducts/music. Nodes below that may have even more specific URL paths. For instance, one node at the next level may correspond with the "subsite" www.examplewebsite1.com/consumerproducts/electronics and may include web pages with URLs such as www.examplewebsite1.com/consumerproducts/electronics/televisions, www.examplewebsite1.com/consumerproducts/electronics/cameras, and www.examplewebsite1.com/consumerproducts/electronics/mobilephones. The content of the web pages and other parameters may also be analyzed to group the web pages into various nodes at different levels of the hierarchy.

Deeplinks correspond with the web pages grouped together in the nodes. In some instances, deeplinks may be provided for all web pages grouped together at a node. In other instances, deeplinks may be provided for only a portion of the web pages grouped together at a node. For instance, web pages may be ranked against one another based on various information, and deeplinks may be included for only the top N web pages. The web pages may be ranked based a variety of different information, such as support across pages for the node or various historical browsing information such as clicks/impressions/visits each web page has received historically from end users (via general web browsing, search result selections, or otherwise), dwell time on web pages, or how recently each web page was visited. By keeping only the top N deeplinks at each node, those N deeplinks may simply be provided from a node at runtime when a search is performed so that a comparison process among deeplinks at a node may not be required at that time.

In some instances, deeplink determination for nodes may be done in a top-down manner. In other words, nodes may be generated (i.e., deeplinks selected for a node) for the deeplink hierarchy starting at a top level and then moving down to generate a next level of nodes. The deeplink hierarchy may also be generated such that a deeplink for a given web page may only be provided at a single node. Accordingly, at any particular level in the hierarchy, if a deeplink is part of a parent node, it may not be considered as a candidate for the node if this approach is employed. This may help to avoid very generic links for deep nodes in the deeplink hierarchy for the website.

A deeplink can be a text link, image, video, or any rich UI element. In some instance, formats of the deeplinks may be decided based on content of the site while creating a hierarchy. During runtime, a format may be chosen based on the search query and classification of the search query.

Generation of the deeplink hierarchy for the web site may also include associating one or more keywords with each node to facilitate identification of nodes relevant to search queries at runtime. Keywords may be identified for a node based on the web pages of the deeplinks associated with the node. In particular, keywords may be identified from information such as the URL of the web pages, the content of the web pages, and anchor text of hyperlinks to the web pages. The top N keywords may be selected for a node, for instance, based on an algorithm such as term frequency * inverse node frequency.

Information regarding the deeplink hierarchy for the website is stored, as shown at block 310. The process of generating a deeplink hierarchy for a website and storing information regarding the deeplink hierarchy may be performed for a number of different websites. Accordingly, information may be available for those websites for selecting deeplinks for search results returned in response to search queries, as will be discussed in further detail below with reference to FIG. 4.

In some instances, deeplinks may be provided for a paid search result. In such instances, the deeplinks provided with the paid search result may correspond with monetizable web pages. Generally, a monetizable web page is one that a consumer may wish to visit in determining whether to make a purchase. For instance, product web pages that describe particular products or groups of products may be considered to be monetizable web pages.

To facilitate providing deeplinks to monetizable web pages for paid search results, identification of monetizable web pages may be taken into consideration when generating a deeplink hierarchy. In some instances, only monetizable web pages from a website may be considered when generating a deeplink hierarchy such that all deeplinks in the deeplink hierarchy correspond with monetizable web pages. This may include developing two deeplink hierarchies for a website: a first deeplink hierarchy for paid search results that includes only monetizable web pages from the website; and a second deeplink hierarchy for algorithmic (i.e., non-paid) search results that may include any web page from the website. Another approach may be to generate a single deeplink hierarchy but to identify deeplinks corresponding with monetizable web pages as such as part of the deeplink hierarchy. Accordingly, when deeplinks are being selected for a paid search result, the deeplinks for monetizable pages may be employed; while when deeplinks are being selected for a non-paid search result, any deeplink may be employed.

Figure 4:
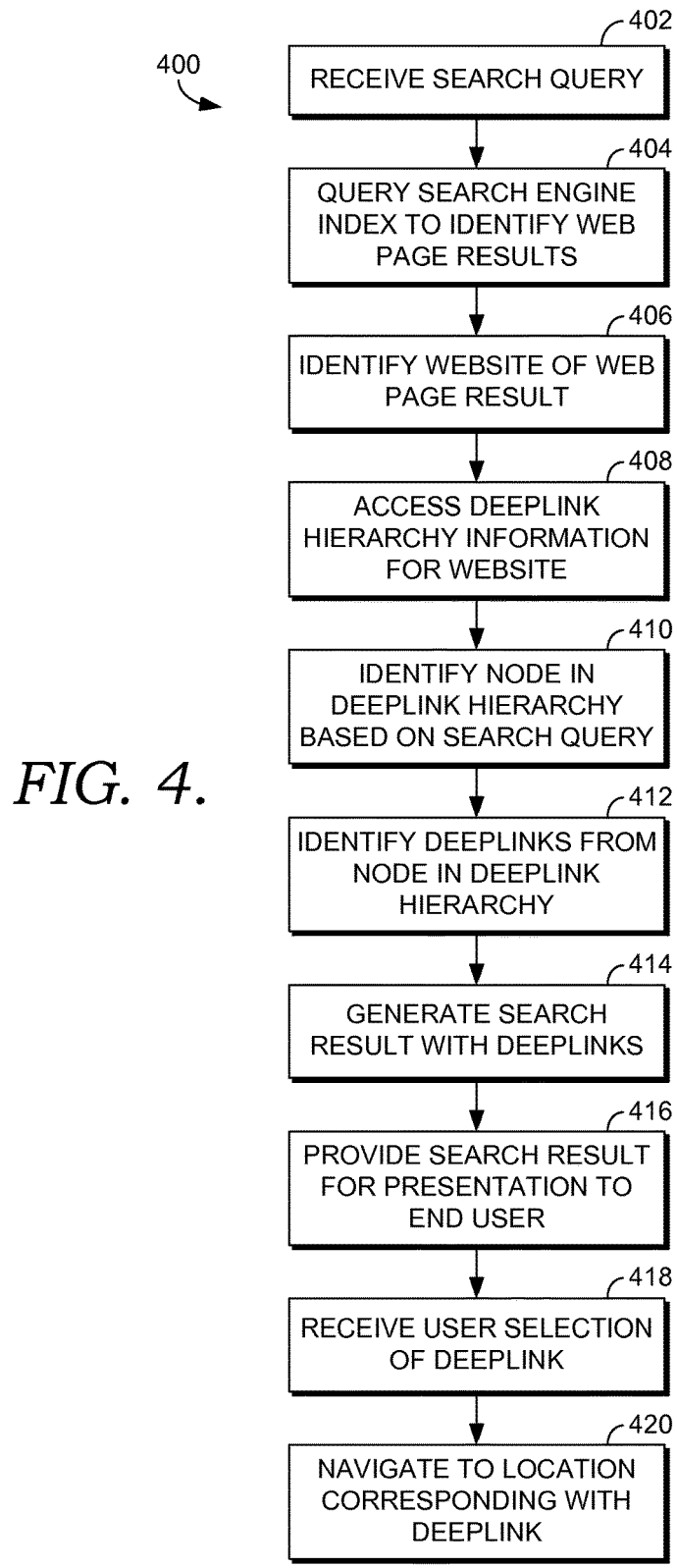
FIG. 4 is a flow diagram showing a method for using a deeplink hierarchy for a website to select context-sensitive deeplinks for a search result in response to a search query in accordance with an embodiment of the present invention.

Referring next to FIG. 4, a flow diagram is provided that illustrates a method 400 for using a deeplink hierarchy for a website to select context-sensitive deeplinks for a search result in response to a search query. As shown at block 402, a search query is initially received from an end user. A search engine index is queried based on the search query to identify web page results that are relevant to the search query, as shown at block 404.

The website corresponding with one of the web page results is identified, as shown at block 406. For instance, suppose a web page result corresponds with a web page with the URL: www.examplewebsite1.com/products/electronics/cameras/pointandshoot, the web page result may be identified as corresponding with the web site at the domain: www.examplewebsite1.com.

Deeplink hierarchy information for the identified website is accessed, as shown at block 408. For instance, a deeplink hierarchy may have been previously generated for the website and information stored regarding that deeplink hierarchy using an approach such as the method 300 described above with reference to FIG. 3. In some instances, the deeplink hierarchy information that is accessed may depend on the type of result. If the result is a paid result, deeplink hierarchy information for monetizable web pages at the website may be accessed. If the result is a non-paid result, any deeplink hierarchy information may be employed.

A node within the deeplink hierarchy is identified based on the search query, as shown at block 410. As discussed above, in some approaches, one or more keywords may be identified for each node based on the deeplinks within the node. Accordingly, identification of a node may include comparing the search query against the node keywords to identify a relevant node. The more specific the search query, the lower the level of the hierarchy at which a node will be identified.

As shown at block 412, deeplinks are identified from the hierarchy node determined at block 410. If the result is a paid result, the deeplinks may be limited to ones that correspond with monetizable web pages. Alternatively, if the result is a non-paid result, any deeplinks may be employed. A search result is then generated to include those deeplinks, as shown at block 414. In some instances, a node may only include a certain number of deeplinks and all of the deeplinks from the node may be included with the search result. In other instances, a node may include a larger number of deeplinks than can be included with the search result, and a process may be performed to select the deeplinks for the search result. This may include, for instance, a comparison of the web pages of the deeplinks to the search query, or another approach such as examining the popularity of the deeplinks (e.g., based on historical information regarding user clicks on the deeplinks). Additionally, in some approaches, more than one node may be selected at block 410. For instance, two nodes may be determined to have similar relevance to the search query. In such instances, a process may be performed to select deeplinks for the search result based on the deeplinks from the multiple nodes. Further, deeplinks may be ranked based on relevance to the search query, and ordered within the search result based on respective rankings. Any and all such variations and combinations thereof are contemplated to be within the scope of embodiments of the present invention.

The search result is provided to the end user device for presentation to the end user, as shown at block 416. When the search result is presented, the search result may include a hyperlink to a destination web page corresponding with the search result as well as the deeplinks selected for the search result, which may include any number of deeplinks. The end user may select a deeplink from the search result, as shown at block 418. In response to the user selection, the end user is navigated to the destination web page corresponding with the selected deeplink, as shown at block 420.

A number of search results may be returned in response to search queries. In some instances, only the top search result may be processed to provide deeplinks using embodiments of the present invention. In other instances, deeplinks may be provided with any search result. Any and all combinations and variations thereof are contemplated to be within the scope of embodiments of the present invention.

Figure 5:
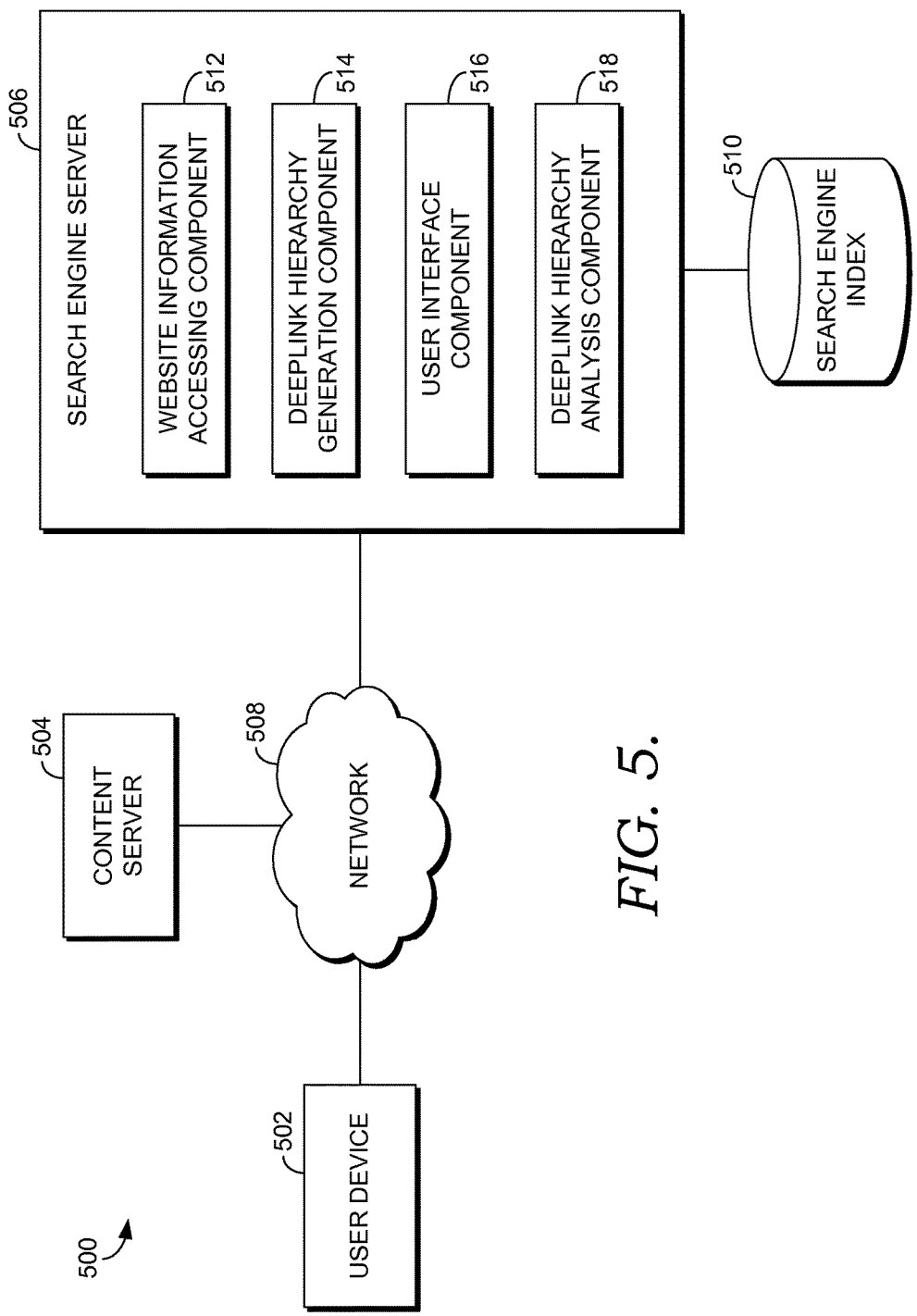
FIG. 5 is a block diagram of an exemplary system in which embodiments of the invention may be employed.

Referring next to FIG. 5, a block diagram is provided illustrating an exemplary system 500 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 500 may include a user device 502, content server 504, and search engine server 506. Each of the components shown in FIG. 5 may be any type of computing device, such as computing device 100 described with reference to FIG. 1, for example. The components may communicate with each other via a network 508, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 500 within the scope of the present invention. Each may comprise a single device or multiple devices cooperating in a distributed environment. For instance, the search engine server 506 may comprise multiple devices arranged in a distributed environment that collectively provide the functionality of the search engine server 506 described herein. Additionally, other components not shown may also be included within the system 500.

The search engine server 506 generally operates to index information regarding web pages served by content servers, such as the content server 504, in a search engine index 510. When the search engine server 506 receives search queries from user devices, such as the user device 502, the search engine queries the search engine index 510 to identify search results based on the users' search queries and returns those search results to the user devices. In accordance with some embodiments of the present invention, the search engine server 506 is also configured to employ a deeplink hierarchy for a website to provide context-sensitive deeplinks with search results.

In the embodiment shown in FIG. 5, the search engine server 506 includes, among other things, a website information accessing component 512, a deeplink hierarchy generation component 514, a user interface component 516, and a deeplink hierarchy analysis component 518.

The website information accessing component 512 operates to access information for a website that may be maintained by a content server, such as the content server 504. This may include crawling the website to access information and/or accessing website information previously gathered and stored, for instance, in the search engine index 510.

The deeplink hierarchy generation component 514 operates to analyze the website information and to generate a deeplink hierarchy for the website. The deeplink hierarchy may be generated, for instance, using an approach such as the method 300 described above with reference to FIG. 3. Information regarding the deeplink hierarchy for the website may then be stored, for instance, in the search engine index 510 or some other storage component. The website information accessing component 512 and the deeplink hierarchy generation component 514 may operate to access information and generate deeplink hierarchies for any number of websites.

The user interface component 516 provides an interface to user devices, such as the user device 502, that may allow users to submit search queries to the search engine server 506 and to receive search results from the search engine server 506. It should be understood that the user device 502 may be any type of computing device employed by a user to submit search queries and receive search results. By way of example only and not limitation, the user device 502 may be a desktop computer, a laptop computer, a tablet computer, a mobile device, or other type of computing device. The user device 502 may include an application that allows a user to enter a search query and submit the search query to the search engine server 506 to retrieve search results. For instance, the user device 502 may include a web browser that includes a search input box or allows a user to access a search page to submit a search query. Other mechanisms for submitting search queries to search engines are contemplated to be within the scope of embodiments of the present invention.

When the search engine server 506 receives a search query from the user device 502, the search engine index 510 is queried to identify search results. Additionally, the deeplink hierarchy analysis component 518 operates to identify deeplinks for a search result by analyzing deeplink hierarchy information for a website corresponding with the search result. The deeplinks may be identified based on the search query and the deeplink hierarchy information using an approach such as the method 400 described above with reference to FIG. 4.

As can be understood, embodiments of the present invention provide deeplink hierarchies for websites that may be employed to select context-sensitive deeplinks for search results. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform a method, the method comprising:
performing an analysis of web pages within a web site based on the URL structure of each web page and content of each web page;
generating a deeplink hierarchy for the website based on the analysis of the web pages within the website, the deeplink hierarchy including nodes at various hierarchical levels in the deeplink hierarchy, each node containing a set of one or more deeplinks corresponding with one or more web pages within the web site, the deeplink hierarchy being generated by assigning deeplinks to hierarchical levels based on URL structure of corresponding web pages and grouping deeplinks into nodes at each hierarchical level based on content of corresponding web pages, at least one node containing a set plurality of deeplinks corresponding with a subset of web pages within the website identified as being similar;
determining one or more keywords for each node based on the one or more web pages corresponding with the set of one or more deeplinks for each node, wherein one or more keywords are determined for the at least one node containing the plurality of deeplinks by analyzing the subset of web pages corresponding with the plurality of deeplinks;
associating the one or more keywords with each node; and
storing information regarding the deeplink hierarchy for the website for use in providing deeplinks for search results.

2. The one or more computer storage media of claim 1, wherein performing the analysis of web pages within the website comprises:
identifying monetizable web pages within the website; and
analyzing the monetizable web pages to generate the deeplink hierarchy for the website such that the deeplinks within the deeplink hierarchy correspond with only monetizable web pages.

3. The one or more computer storage media of claim 1, wherein performing the analysis of web pages within the website comprises:
identifying monetizable web pages within the website; and
providing an indication within the deeplink hierarchy deeplinks that correspond with monetizable pages.

4. The one or more computer storage media of claim 1, wherein generating the deeplink hierarchy for the website comprises:
grouping a first set of web pages at a first node;
ranking the web pages from the first set of web pages against one another; and
including deeplinks for the first node for only a portion of the web pages from the first set of web pages based on the ranking of the web pages.

5. The one or more computer storage media of claim 4, wherein the web pages from the first set of web pages are ranked against one another based on historical statistics about end users' interaction with web pages.

6. The one or more computer storage media of claim 1, wherein the deeplink hierarchy is generated using a top-down approach such that deeplinks included for web pages in a node are not included in lower level nodes.

7. The one or more computer storage media of claim 1, wherein the one or more key words are identified for a first node based on at least one selected from the following: URLs of web pages for the first node, content of web pages for the first node, and anchor text of hyperlinks to web pages for the first node.

8. The one or more computer storage media of claim 1, wherein the method further comprises:
receiving a search query from an end user at a search engine service;
identifying a web page in response to the search query by querying a search engine index based on the search query;
accessing information regarding the deeplink hierarchy for the website;
identifying deeplinks for the web page based on the deeplink hierarchy and the search query from the end user;
generating a search result for the web page to include the deeplinks; and
providing the search result for presentation to the end user.

9. The one or more computer storage media of claim 8, wherein identifying deeplinks for the web page based on the deeplink hierarchy comprises:
comparing the search query with one or more keywords associated with each node in the deeplink hierarchy to identify a relevant node in the deeplink hierarchy; and
identifying the deeplinks from the relevant node in the deeplink hierarchy.

10. The one or more computer storage media of claim 9, wherein identifying the deeplinks from the relevant node in the deeplink hierarchy comprises ranking a plurality of deeplinks from the relevant node and selecting a subset of the plurality of deeplinks based on the ranking.

11. The one or more computer storage media of claim 9, wherein the search result is a paid search result and the deeplinks correspond with monetizable web pages.

12. The one or more computer storage media of claim 9, wherein the search result is a non-paid search result.

13. A method performed by a search engine service that includes one or more computing devices with one or more processors, the method comprising:
receiving a search query from an end user at the search engine service;
identifying a web page in response to the search query by querying a search engine index based on the search query;
accessing information regarding a deeplink hierarchy for a website at which the web page is located, the deeplink hierarchy comprising a hierarchy of nodes, each node including a group of one or more deeplinks that link to web pages at the website, the deeplink hierarchy having been generated by assigning deeplinks to hierarchical levels based on URL structure of corresponding web pages and grouping deeplinks into nodes at each hierarchical level based on content of corresponding web pages, a first node containing a grouping plurality of deeplinks and corresponding with one or more keywords based on web pages corresponding with the plurality of deeplinks;
comparing the search query with one or more keywords associated with each node in the deeplink hierarchy;

identifying the first node containing the plurality of deeplinks as relevant based on comparing the search query to the one or more keywords associated with the first node;

identifying at least a portion of the plurality of deeplinks from the first node;

generating a search result for the web page to include the at least a portion of the plurality of deeplinks from the first node; and providing the search result for presentation to the end user.

14. The method of claim 13, wherein identifying the at least a portion of the plurality of deeplinks from the relevant node in the deeplink hierarchy comprises ranking the plurality of deeplinks from the relevant node and selecting a subset of the plurality of deeplinks based on the ranking.

15. The method of claim 13, wherein the search result is a paid search result and the deeplinks correspond with monetizable web pages.

16. The method of claim 13, wherein the search result is a non-paid search result.

17. A search engine system including a processor and a plurality of components, the plurality of components comprising:

a deeplink hierarchy generation component that analyzes information for a plurality of websites including the URL structure and content of web pages within the websites and generates a deeplink hierarchy for each website, each deeplink hierarchy including a hierarchy of nodes with at least one node containing a plurality of deeplinks that link to web pages within a given website, each deeplink hierarchy being generated by assigning deeplinks to hierarchical levels based on URL structure of corresponding web pages and grouping deeplinks into nodes at each hierarchical level based on content of corresponding web pages;

a user interface component that operates to receive search queries from end users and to return search results in response to the search queries; and a deeplink hierarchy analysis component that operates to identify relevant deeplinks for the search results based on the deeplink hierarchies.

* * * * *